(12) United States Patent
Eriksen

(10) Patent No.: US 12,158,196 B2
(45) Date of Patent: Dec. 3, 2024

(54) ACTUATOR DEVICE

(71) Applicant: ELECTRICAL SUBSEA & DRILLING AS, Straume (NO)

(72) Inventor: Egil Eriksen, Al (NO)

(73) Assignee: ELECTRICAL SUBSEA & DRILLING AS, Straume (NO)

( * ) Notice: Subject to any disclaimer, the term of this patent is extended or adjusted under 35 U.S.C. 154(b) by 0 days.

(21) Appl. No.: 18/037,327

(22) PCT Filed: Nov. 17, 2021

(86) PCT No.: PCT/NO2021/050241
§ 371 (c)(1),
(2) Date: May 17, 2023

(87) PCT Pub. No.: WO2022/114961
PCT Pub. Date: Jun. 2, 2022

(65) Prior Publication Data
US 2023/0417309 A1    Dec. 28, 2023

(30) Foreign Application Priority Data

Nov. 24, 2020  (NO) .................................. 20201286
Nov. 16, 2021  (NO) .................................. 20211368

(51) Int. Cl.
*F16H 25/20*    (2006.01)
(52) U.S. Cl.
CPC . *F16H 25/2015* (2013.01); *F16H 2025/2053* (2013.01); *F16H 2025/2062* (2013.01)

(58) Field of Classification Search
CPC ..... F16H 2025/2053; F16H 2025/2059; F16H 25/2006; F16H 25/2015; E21B 33/062; E21B 33/061; E21B 33/063
See application file for complete search history.

(56) References Cited

U.S. PATENT DOCUMENTS 7,560,888 B2    7/2009  Quitmeyer et al.
11,454,307 B2 *  9/2022  Eriksen ................. F16K 31/047
(Continued)

FOREIGN PATENT DOCUMENTS

DE    202 13 391 U1    2/2004
IT    BS 2012 0042 A1    9/2013
(Continued)

*Primary Examiner* — Gregory Robert Weber
(74) *Attorney, Agent, or Firm* — Norman B. Thot

(57) ABSTRACT

An actuator device includes a housing, parallel rolling screws supported in the housing, an actuator element, an actuator spindle anchored in the actuator element, a control system, sensor heads, and position sensors. Each rolling screw is coupled to an electric motor and engages a roller nut. Rotating the rolling screws axially displaces the rolling nuts. The actuator element engages with each rolling nut. One sensor head is arranged on the actuator element near each roller nut. One position sensor is fastened in the actuator adjacent each sensor head and communicates position information of each sensor head to the control system. Each electric motor has an encoder coupled to the control system. The encoder provides a primary motor control. The control system compares information from each position sensor with information from the encoder. The information from each position sensor acts as a secondary position control of the actuator element.

8 Claims, 1 Drawing Sheet

(56) References Cited

U.S. PATENT DOCUMENTS

| | | | | |
|---|---|---|---|---|
| 11,664,714 B2* | 5/2023 | Riehl | ................... | H02K 41/02 |
| | | | | 324/661 |
| 2006/0006355 A1 | 1/2006 | Biester | | |
| 2010/0059944 A1 | 3/2010 | Oteman et al. | | |
| 2015/0008000 A1 | 1/2015 | Eriksen | | |
| 2016/0377099 A1 | 12/2016 | Stauder et al. | | |
| 2017/0358970 A1 | 12/2017 | Kim | | |
| 2020/0186005 A1* | 6/2020 | Borgarelli | ............. | B64C 13/505 |
| 2020/0300344 A1 | 9/2020 | Matsuto et al. | | |
| 2020/0340562 A1 | 10/2020 | Eriksen | | |

FOREIGN PATENT DOCUMENTS

| | | |
|---|---|---|
| NO | 344201 B1 | 10/2019 |
| WO | WO 2010/027701 A1 | 3/2010 |
| WO | WO 2013/119126 A1 | 8/2013 |
| WO | WO 2018/041966 A1 | 3/2018 |
| WO | WO-2018051881 A1 * | 3/2018 |
| WO | WO 2019/001652 A1 | 1/2019 |
| WO | WO 2019/078727 | 4/2019 |
| WO | WO 2019/102119 A1 | 5/2019 |

* cited by examiner

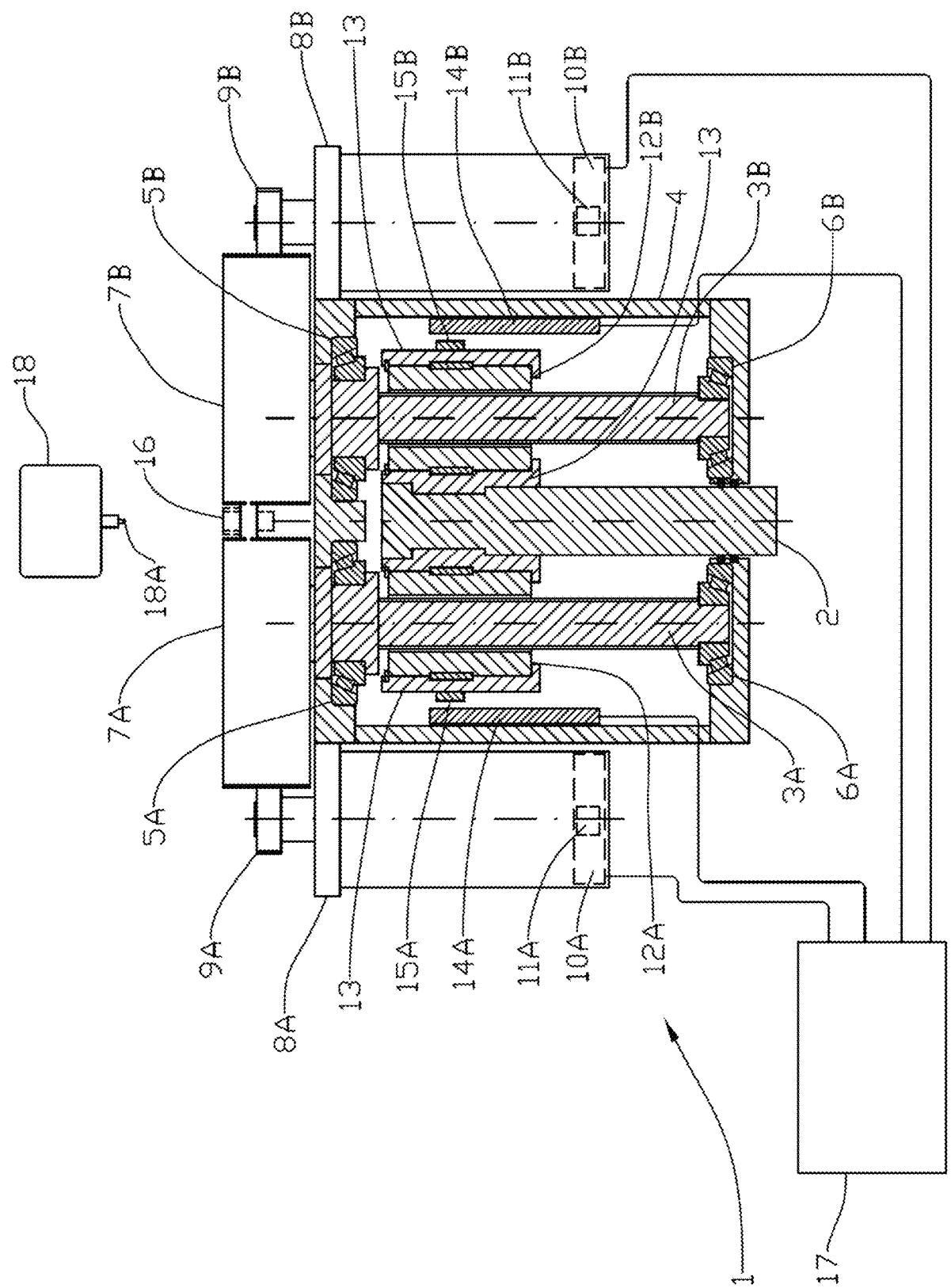

ACTUATOR DEVICE

CROSS REFERENCE TO PRIOR APPLICATIONS

This application is a U.S. National Phase application under 35 U.S.C. § 371 of International Application No. PCT/NO2021/050241, filed on Nov. 17, 2021 and which claims benefit to Norwegian Patent Application No. 20201286, filed on Nov. 24, 2020, and to Norwegian Patent Application No. 20211368, filed on Nov. 16, 2021. The International Application was published in English on Jun. 2, 2022 as WO 2022/114961 A1 under PCT Article 21(2).

FIELD

This present invention relates to an electromechanical force actuator device. The present invention more specifically relates to a device that controls coordination of at least two parallel actuation devices that each comprise an electric motor, a gear system, a rolling screw, and a rolling nut that are coupled to a common actuation element for an actuator spindle.

BACKGROUND

The term "force actuator" is used to emphasize that an actuator according to the present invention is especially suitable for use where large actuation forces are needed. The area of application is typically cutting and barrier functions in blow-out preventers (BOP) for drilling and well completion uses, as well as corresponding functions for lighter well intervention equipment. The force actuator can be adapted to subsea use.

NO344201 describes an electromechanical actuator solution with two cooperating, parallel rolling screws, rotatably arranged in an actuator housing. Each rolling screw is rotated by an electric motor via a gear system, and drives a respective rolling nut that is coupled to a separate actuation element via spherical bearings. The construction allows some imprecision in the parallel drive of the rolling screws in that the actuation elements are coupled to the rolling nuts via spherical bearings, and each actuation element partially abuts a rounded end surface on an actuator spindle and displaces it in operative use.

WO 2010/027701 A1 describes an actuator with counter-rotating motors with linear output. The actuator comprises a first rotary motor, a second rotary motor arranged in series with the first rotary motor, and a transmission coupled to the first and second rotary motors, wherein the transmission converts rotation of the first rotary motor in a first direction and simultaneous rotation of the second rotary motor in a second direction to a linear motion of an output shaft in a single direction.

SUMMARY

An aspect of the present invention is to remedy or reduce at least one of the disadvantages of the prior art, or at least to provide a useful alternative to the prior art.

In an embodiment, the present invention provides an actuator device which includes an actuator housing, at least two parallel rolling screws which are each rotatably bearingly supported in the actuator housing, an actuator element, an actuator spindle which is anchored in the actuator element, a control system, sensor heads, and contactless, linear position sensors. Each of the at least two parallel rolling screws are coupled, via a rotation device, to an electric motor, and each of the at least two parallel rolling screws are in engagement with a roller nut. A rotation of the at least two parallel rolling screws generates an axial displacement of the rolling nuts along the at least two parallel rolling screws. The actuator element is configured to engage with each rolling nut. One sensor head is arranged on the actuator element near to each roller nut. One contactless, linear position sensor is fastened in the actuator housing adjacent to each of the sensor heads and is configured to communicate information about a position of each of the sensor heads to the control system. Each electric motor comprises a motor driver and at least one encoder which is coupled to the control system, the at least one encoder being configured to provide a primary motor control. The control system is configured to compare information from each contactless, linear position sensor with information from the at least one encoder. The information from each contactless, linear position sensor acts as a secondary position control of the actuator element.

BRIEF DESCRIPTION OF THE DRAWING

The present invention is described in greater detail below on the basis of embodiments and of the drawing in which:

The FIGURE shows a partial axial section through the actuator, whereby details for rotation elements, the brake system, and fastening thereof are not shown.

DETAILED DESCRIPTION

The present invention provides an electrically driven actuator solution with at least two cooperating, parallel rolling screws rotatably arranged in an actuator housing. Each rolling screw is rotated by an electric motor via a gear system, and drives a respective rolling nut that is coupled to a common actuation element, where an actuator spindle is anchored. The motors are so-called stepper motors or synchronous motors, known from use in precise control of tool machines. With precise, electronic coordination of the rolling screws, the construction can be made simpler, more compact, and more robust compared to the prior art, where the mechanical construction is arranged to absorb some imprecision in the coordination of the rolling screws. An even load distribution can be achieved via a precise control of the torque and the position of the rolling nuts and with a robust design of the common actuation element. When the actuator spindle is solidly anchored in the actuation element, the fastening does not limit the force with which the actuator spindle can be pulled back. The actuator can be operated at full force in both directions provided that thrust bearings for the actuator's rolling screws are appropriately dimensioned. An advantage of an electrically driven actuator solution compared to hydraulic operation is a full control and monitoring of force and position of the effective stroke of the actuator and thereby the well barrier components. Dampening end stops will further provide less load on the packers in the well barrier element.

The present invention more specifically relates to an actuator that comprises:
 an actuator housing;
 at least two parallel rolling screws that each are rotatably bearingly supported in the actuator housing and are coupled via rotation devices to an electric motor and are in engagement with a roller nut, wherein rotation of the rolling screws generates an axial displacement of the rolling nuts along the rolling screws;

an actuator element which is in engagement with the rolling nuts; and an actuator spindle which is anchored in the actuator element, characterized in that, the electric motor is provided with a motor driver and at least one encoder which is coupled to a control system, the encoder providing a primary motor control, a sensor head is arranged on the actuator element near each roller nut, and a contactless, linear position sensor is fastened in the actuator housing adjacent to each of the sensor heads and is arranged to communicate information about the position of the respective sensor head to the control system configured for comparing information from the position sensor with the information from the encoder, whereby the information from the position sensor acts as a secondary position control of the actuator element.

The electric motor may be a stepper motor. The electric motor can alternatively be a synchronous motor provided with the motor driver and the at least one encoder. An effect thereof is that the properties of the electric motor provide further possibilities for controlling the position of each rolling nut.

A transmission device may be arranged to be connectable to the rotation device and couplable to an external rotation device. An effect thereof is that an external device, for example, an underwater vehicle, can operate the actuator if the power supply to the electric motors fails.

An example of an embodiment of the present invention is described below under reference to the FIGURE that shows a partial axial section through the actuator. Details for rotation elements, a brake system, and fastening thereof are not shown.

All reference numbers refer to the position shown in the FIGURE.

An expert on the subject will understand that the FIGURE is in principle only a drawing. The relative ratio between individual elements may also be distorted.

In the FIGURE, reference number 1 indicates a force actuator according to the present invention. The force actuator 1 is configured to displace an actuator spindle 2 into a well barrier device (not shown) and comprises at least two parallel rolling screws 3A, 3B that are rotatably arranged in an actuator housing 4 with thrust bearings 5A, 5B, 6A, 6B on the ends, and rotation devices 7A, 7B coupled to the rolling screws 3A, 3B.

The rotation devices 7A, 7B consist of a gear system (not shown) that is connected to respective electric stepper motors or synchronous motors 8A, 8B via motor gears 9A, 9B for simultaneous rotation of the rolling screws 3A, 3B. Each of the motors 8A, 8B are provided with a motor driver 10A, 10B that, from a DC or AC supply voltage, feeds current pulses to motor windings in a stepper motor, alternatively synchronizes the rotation of a motor shaft to a synchronous motor with the frequency of the supply voltage, and an encoder 11A, 11B that provides feedback signals by tracking the speed and/or position of the motor shaft.

A control system 17 is coupled to the motor drivers 10A, 10B and the encoders 11A, 11B, and controls revolution, position and torque for the motors 8A, 8B and provides for a precise, parallel coordination of the actuator devices. In addition to motor data, the control system 17 typically monitors other condition data such as possible water ingress, vibration, temperature, and secondary measuring of the stroke displacement of the force actuator 1.

A rolling nut 12A, 12B engages in each of the rolling screws 3A, 3B. Rotation of the rolling screws 3A, 3B leads to an axial displacement of the rolling nuts 12A, 12B along the rolling screws 3A, 3B. The rolling nuts 12A, 12B are enclosed by a common actuation element 13, and the actuator spindle 2 is anchored in a centered manner in the actuator element 13. An axial displacement of the rolling nuts 12A, 12B thereby results in a corresponding axial displacement of the actuation element 13.

Contactless, linear position sensors 14A, 14B are arranged on opposite sides inside the actuator housing 4 and register the stroke displacement of the force actuator 1 by continuously measuring the position of respective sensor heads 15A, 15B that are mounted on opposite sides of the actuation element 13, respectively. The signals are transferred to the control system 17 and act as a secondary position control of the actuation element 13 for comparison with information provided by the primary motor control provided by the previously mentioned encoders 11A, 11B.

The force actuator 1 can, for example, be provided with a brake system (not shown) to hold the force actuator 1 locked when the motors 8A, 8B are not in operation.

By guiding a transmission device, shown as a gear 16 in the FIGURE, to engagement with the rotation device 7A, 7B, the rolling screws 3A, 3B are brought to rotation via an external rotation device 18A, for example, a moment tool on a subsea remotely operated vehicle (ROV) 18, possibly after the (not shown) brake system is released. Operation of the force actuator 1 with the external rotation device 18A can be necessary if, for example, the power supply to the motors 8A, 8B is interrupted.

Necessary seals are not described, but are known to a skilled person.

It should be noted that all embodiments mentioned above illustrate the present invention, but do not delimit it, and experts on the subject will be able to design many alternative embodiments without deviating from the scope thereof.

Reference should also be had to the appended claims. The use in the claims of the verb "to comprise" and its different forms does not exclude the presence of elements or steps not mentioned therein. The indefinite articles "a" or "an" before an element do not exclude the presence of more such elements.

LIST OF REFERENCE NUMERALS

1 Force actuator
2 Actuator spindle
3A, 3B Rolling screw
4 Actuator housing
5A, 5B Thrust bearing
6A, 6B Thrust bearing
7A, 7B Rotation device
8A, 8B Electric stepper motor/Synchronous motor
9A, 9B Motor gears
10A, 10B Motor driver
11A, 11B Encoder
12A, 12B Rolling nut
13 Actuation element
14A, 14B Liner position sensor
15A, 15B Sensor head
16 Transmission device/Gear
17 Control system
18 Subsea remotely operated vehicle (ROV)
18A External rotation device

What is claimed is:

1. An actuator device comprising:
   an actuator housing;
   rotation devices comprising a first rotation device and a second rotation device;
   electric motors comprising a first electric motor and a second electric motor;
   roller nuts comprising a first roller nut and a second roller nut;
   a first rolling screw and a second rolling screw which are parallel to each other, each of the first rolling screw and the second rolling screw being configured to rotate and to be supported in the actuator housing, the first rolling screw being coupled, via the first rotation device, to the first electric motor, the second rolling screw being coupled, via the second rotation device, to the second electric motor, the first rolling screw being in engagement with the first roller nut, the second rolling screw being in engagement with the second roller nut, wherein, a rotation of the first rolling screw generates an axial displacement of the first roller nut along the first rolling screw, and a rotation of the second rolling screw generates an axial displacement of the second roller nut along the second rolling screw;
   an actuator element which is configured to engage with the first roller nut and with the second roller nut;
   an actuator spindle which is anchored in the actuator element;
   a control system;
   two sensor heads comprising a first sensor head and a second sensor head, the first sensor head being arranged on the actuation element near to the first roller nut, the second sensor head being arranged on the actuator element near to the second roller nut, and the actuation spindle being arranged between the first sensor head and the second sensor head; and
   two contactless, linear position sensors comprising a first contactless, linear position sensor and a second contactless, linear position sensor, the two contactless, linear position sensors being fastened in the actuator housing so that the first contactless, linear position sensor is adjacent to the first sensor head and the second contactless, linear position sensor is adjacent to the second sensor head, the first contactless, linear position sensor being configured to communicate information about a position of the first sensor head to the control system, and the second contactless, linear position sensor being configured to communicate information about a position of the second sensor head to the control system,
   wherein,
   the first electric motor comprises a first motor driver and a first encoder which is coupled to the control system, the second electric motor comprises a second motor driver and a second encoder which is coupled to the control system, each of the first encoder and the second encoder being configured to provide a primary motor control,
   the control system is configured to compare the information from the first contactless, linear position sensor with information from the first encoder and to compare the information from the second contactless, linear position sensor with information from the second encoder, and
   the information from the first contactless, linear position sensor and from the second contactless, linear position sensor act as a secondary position control of the actuator element.

2. The actuator device as recited in claim 1, wherein each of the first electric motor and the second electric motor is a stepper motor.

3. The actuator device as recited in claim 1, wherein each of the first electric motor and the second electric motor is a synchronous motor.

4. The actuator device as recited in claim 1, further comprising:
   a transmission device which is configured to be connectable to the first rotation device, to the second rotation device, and to be couplable to an external rotation device.

5. The actuator device as recited in claim 1, wherein,
   the first sensor head and the first contactless, linear position sensor are each operatively connected to the first electric motor, and
   the second sensor head and the second contactless, linear position sensor are each operatively connected to the second electric motor.

6. The actuator device as recited in claim 5, wherein the operative connection of the first sensor head and the first contactless, linear position sensor to the first electric motor and the operative connection of the second sensor head and the second contactless, linear position sensor to the second electric motor provide an electronic coordination of the roller nuts.

7. The actuator device as recited in claim 1, wherein,
   the first sensor head and the second sensor heard are arranged on opposite sides of an outside of the actuator element, and
   each of the first rolling screw, the second rolling screw and the actuator spindle are arranged between the first sensor head and the second sensor head.

8. The actuator device as recited in claim 1, wherein the first roller nut and the second roller nut are completely radially enclosed by the actuation element.

* * * * *